United States Patent [19]

Rae

[11] Patent Number: 4,490,600

[45] Date of Patent: Dec. 25, 1984

[54] WIRE ELECTRODE SPARK EROSION

[75] Inventor: Malcolm C. Rae, Redhill, England

[73] Assignee: Redland Roof Tiles Limited, Surrey, England

[21] Appl. No.: 346,121

[22] Filed: Feb. 4, 1982

[30] Foreign Application Priority Data

Feb. 13, 1981 [GB] United Kingdom ............... 8104525

[51] Int. Cl.³ .............................................. B23P 1/08
[52] U.S. Cl. .............................. 219/69 W; 219/69 M; 76/107 R
[58] Field of Search ............... 219/69 E, 69 R, 69 M, 219/69 W, 68; 76/107 R, 107 A, DIG. 11

[56] References Cited

U.S. PATENT DOCUMENTS 3,584,179 6/1971 Schroeder ..................... 219/69 M
4,103,137 7/1978 Levitt et al. ................... 219/69 W

FOREIGN PATENT DOCUMENTS 0137834 10/1980 Japan ............................. 219/69 M

OTHER PUBLICATIONS

Japax, Adaptive Control Method, 10-15-1974.

Primary Examiner—M. H. Paschall
Attorney, Agent, or Firm—Young & Thompson

[57] ABSTRACT

Hardmetal lamina are cut, by a process known as electrical discharge machining, from a block of hardmetal using a wire electrode. The laminae so formed may then be attached by adhesive or epoxy resin to a suitable base in order to form a hard metal surfaced tool. Provision is made for preventing this hardmetal from shearing from its mounting, and also to remove any heat generated within the hardmetal. Reference is made especially to using the above construction for a 'slipper' within a tile producing machine. The word 'hardmetal' is used to denote powdered carbides of the transition metals, cemented into solid masses by a matrix of a metal of a lower melting point.

9 Claims, 8 Drawing Figures

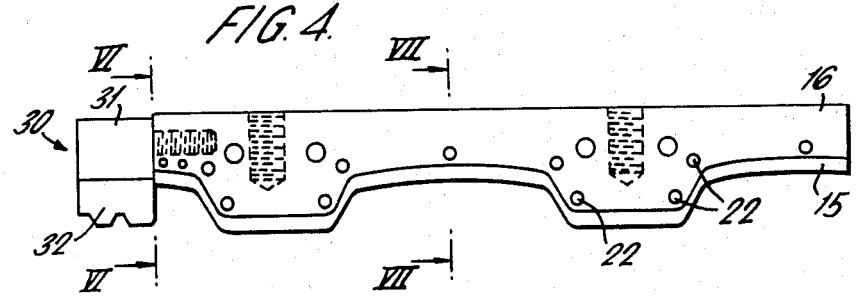
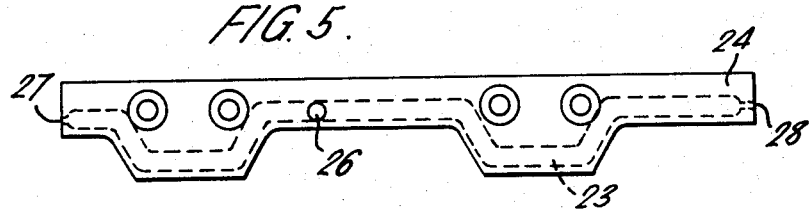
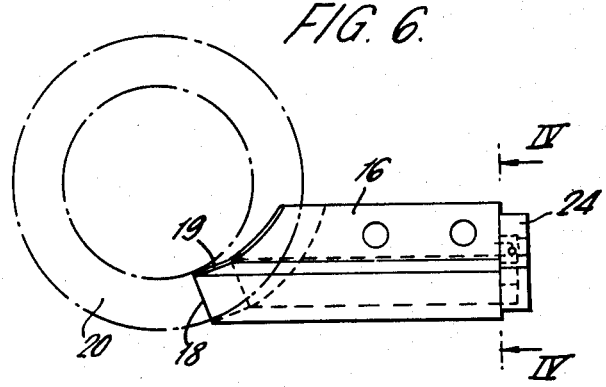

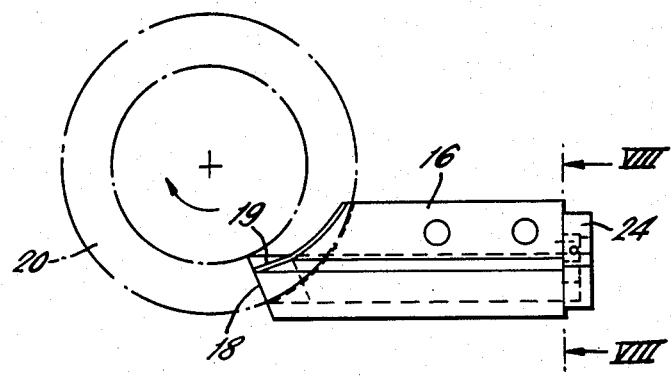
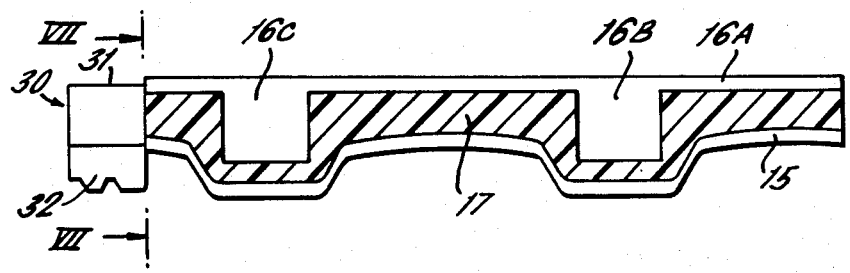

WIRE ELECTRODE SPARK EROSION

BACKGROUND OF THE INVENTION

1. Field of the Invention

This invention relates to the making of hardmetal lamina by electric discharge machining (EDM), commonly known as "spark erosion", using a wire electrode. The invention also relates to a method of making a hard metal surface tool comprising the steps of producing a hardmetal lamina by a method as above, and securing the lamina to the surface of a mounting bolster shaped to receive the lamina.

2. Description of Prior Art

The word "hardmetal" is used in this specification to denote powdered carbides of the transition metals, notably tungsten, tantalum, titanium and niobium, cemented into solid masses by mixing with powdered metal of lower melting point such as cobalt or nickel and then compressing and sintering. Hardmetal is characterised by extreme hardness and is often used for components subject to heavy wear or abrasion.

A method of machining referred to as "Electrical Discharge Machining" is known as disclosed in an article in "Tooling & Production" March 1977 pages 46-48 in which an electrical discharge is used to cut a piece of material by producing local heating. The use of hardmetal in places where there is expected to be heavy wear or a brasion is also known.

With hardmetal there has always been a problem of machining. Creating the fairly thin, but often complex profiles of the pieces of hardmetal needed to cover the vulnerable areas of tools has proved almost impossible, as hardmetal is so brittle. Thus, to cover a tool, many small pieces of hardmetal had to be used, with the attendant problem of the attachment of these pieces, and also of preferential wear of the joins.

SUMMARY OF THE INVENTION

The invention as claimed is intended to remedy these drawbacks. It solves the problem of machining the pieces of hardmetal, so that almost any shape of tool may be produced having a lamina surface of hardmetal. The invention provides a method of making a hardmetal surfaced tool, the method comprising first making a hardmetal lamina by the steps of making a first cut by wire electrode spark erosion through a block of hardmetal, and making a second cut by wire electrode spark erosion through the block, the second cut being generally parallel to the first, to form a lamina of hardmetal between the two lines of cut, and then securing the lamina to the surface of a mounting bolster shaped to receive the lamina, thereby to form the tool. The second cut may be similar to the first but spaced therefrom by a predetermined distance in a direction perpendicular to the wire electrode so that the lamina has a thickness in the said direction equal to the predetermined distance.

The lamina may be secured to the bolster by adhesive. The invention further provides a hardmetal surfaced slipper for a tile making machine made as above.

The slipper preferably comprises cooling pins embedded in and projecting from the bolster adjacent to the hardmetal lamina for cooling the slipper in use. The projecting ends of these pins may be finned.

A shear stop member may be secured to the bolster while abutting the lamina to prevent shear failure between the lamina and bolster. The cooling pins may project into a cooling fluid manifold formed in the stop member, cooling fluid being passed through the manifold, in use, to extract heat from the slipper through the cooling pins. Conveniently, the fluid is air.

The main advantage offered by the above invention is that a single piece of laminar hardmetal may be produced, in almost any desired profile, the reduction to one of the number of hardmetal pieces required greatly simplifying the manufacture of the hardmetal faced tool, extending the life of the tool by eliminating areas of preferential wear, and simplifying the cooling of the face thereof. Further advantages include a reduced risk of shear failure at the hardmetal/hardment mounting interface, an effective cooling means for the hardmetal, and the possibility for more complicated hardmetal faced tool shapes and profiles.

BRIEF DESCRIPTION OF THE DRAWINGS

A method according to the invention will now be described, by way of example, with reference to the accompanying drawings, in which:

FIG. 4 is a sectional elevation of the completed slipper;

FIG. 5 is an elevation corresponding to FIG. 4 but showing the lamina shear stop alone;

FIG. 6 is a sectional side elevation of the slipper taken along the line VI—VI of FIG. 4, the line of section of FIG. 4 being shown by the line IV—IV;

FIG. 7 is a sectional side elevation of the slipper as in FIG. 6, but with the roller shown in a position for use as a rotating drum electrode; and FIG. 8 is a sectional elevation of the completed slipper, corresponding to FIG. 4, but showing an alternative method of mounting the hardmetal lamina using a layer of epoxy resin.

DESCRIPTION OF THE PREFERRED EMBODIMENT

Figure 1:
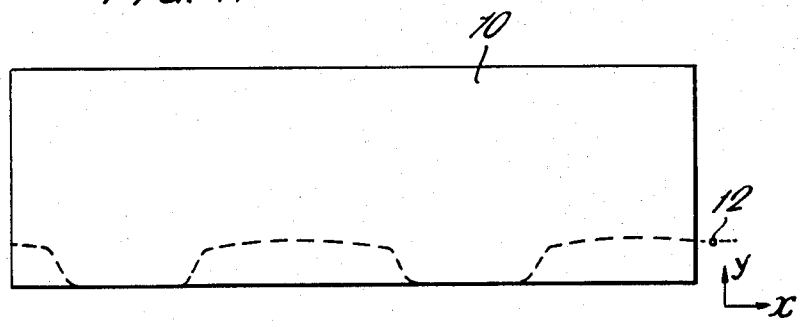
FIGS. 1 to 3 show successive stages in the cutting of a hardmetal lamina for covering a slipper for a tile making machine.
Figure 2:
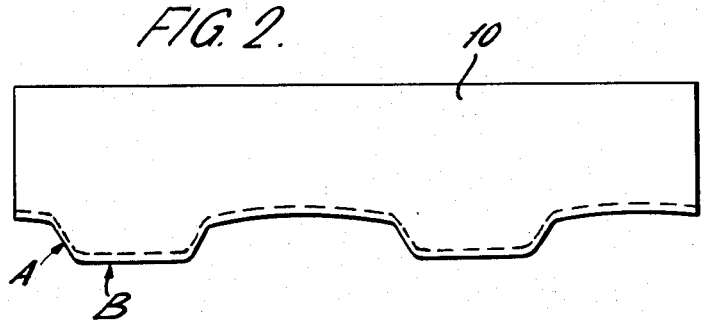
Figure 3:
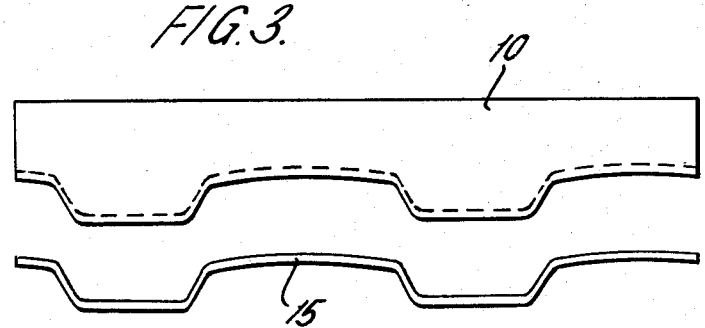

A block 10 of hardmetal, such as tungsten carbide, is mounted in a wire electrode spark erosion machine, FIGS. 1 to 3 showing the block in plan. The wire electrode 12 is vertical and, in use, is fed continuously between two reels; once used, it is disposed of. The block is moved by a programmed computer in the x and y directions. A first cut by spark erosin is made along the dotted line in FIG. 1, leaving the shape shown in FIG. 2. A second cut is then made along the dotted line in FIG. 2, this second cut having a profile similar to the first cut but spaced therefrom in the y direction by a predetermined distance, this distance may be, for example 5 mm or may be as little as 3 mm. Thus a lamina 15 of hardmetal is produced. A third cut (shown by the dotted line in FIG. 3) and further similar cuts can be made to provide further laminae.

It will be appreciated that although the cuts are generally parallel, the fact that they are spaced by a certain distance in the y direction means that the cuts will be closer together in a region of cut which is function of x and y coordinates, as for example at A, than a region of a function of x alone, as at B. The cuts can of course be adjusted to give a constant thickness of lamina, but this entails a certain waste of material between laminae.

The lamina 15 is attached to a machining block and the lower "backing-off" edge 18 of the slipper is then machined in the spark erosion machine, followed by the upper "backing-off" edge 19, these operations again being controlled by computer to give the required fit with the roller 20 of the tile making machine.

Alternatively, particularly for thinner laminae, the backing-off edge 19 is formed by a process as shown in FIG. 7, using a rotating drum electrode provided by a roller similar to that to be used with the slipper, or by the actual roller to be used with the slipper, whereby a matched slipper or matched pair of roller and slipper is made.

In this process, the slipper is mounted in an appropriate vise or fixture on the spark erosion machine, and using the rotating roller as the electrode, as shown in FIG. 7, the backing-off edge 19 can be generated accurately, even on lamina only 3 mm thick. Under normal operating conditions the roller remains reasonably smooth. However, some high spots may be generated and these are easily removed by polishing when the slipper has been completed.

The hardmetal lamina 15 is then removed from the machining block and bonded to a steel bolster 16 using a heat resistant epoxy resin, the bolster 16 having previously been shaped to receive the lamina snugly. A typical epoxy resin to use is Araldite 2007, which is an epoxy resin usable up to 130° C. Alternatively, plate 16A (FIG. 8) is positioned in a mould, the plate 16A having bosses 16B and 16C in which appropriate mounting bolt holes are provided. The lamina 15 is positioned, as shown in FIG. 8, and an appropriate mixture of an epoxy resin material 17 is fed into the mould to complete the composite bolster. The roller and slipper are shown in their operative position in FIG. 6, their overall shape being well known in a conventional tile making machine in which the concrete mix is semi-extruded beneath the roller and compacted into pallets (not shown) by the slipper, the pallets travelling beneath the slipper from left to right in FIG. 6. The roller 20 has a surface corresponding to the profile of the lamina, which surface may be of hardmetal machined by spark erosion. A "lock-end" 30 of a steel block 31 and hardmetal covering 32 secured thereto is bolted to the bolster 16 to complete the working surface of the slipper for the required tile shape. The lock-end 30 may be machined by spark erosin and its backing-off edges provided as for the bolster 16 and lamina 15.

Alternatively, the lock-end 30 may be formed integrally with the remainder of the slipper in which instance a single piece lamina of hardmetal can be cut to form the entire working surface of the slipper. It will be appreciated that the cut through the block of hardmetal providing the surface of the lamina for attaching to the bolster must in this case be compensated to provide sufficient thickness of the lamina where its working surface is orientated in the y direction as one part of the lock-end.

In order to extract heat from the slipper generated by the tile making process, cooling pins 22 are provided embedded in the bolster 16. The outer ends of the pins 22 project into a cooling manifold 23 formed in a lamina shear stop 24 bolted to the bolster 16. Cooling fluid, typically air, is passed into the manifold through an inlet 26 and exhaust through outlets 27 and 28. The outer ends of the pins 22 projecting into the manifold 23 may be finned for increased heat transfer.

It will be appreciated that the shear stop 24 prevents the lamina 15 shearing off the bolster 16 along the line of bonding. After wear of the slipper has occurred, the slipper may be returned to the spark erosion machine and the "backing-off" edge re-shaped by spark erosion as before with the bolster acting as a mounting block.

If a breakage of a hardmetal lamina occurs, the broken portion may be cut out and replaced with an oversize hardmetal fillet. The spark erosin machine can then be used to erode the fillet down to size.

Slippers as described above have been found to have some 50 to 100 times the life of ordinary tool steel slippers.

I claim:

1. A method of making a hardmetal surfaced slipper for a tile making machine, the method comprising first making a hardmetal lamina by the steps of making a first cut by wire electrode spark erosion through a block of hardmetal, and making a second cut by wire electrode spark erosion through the block, the second cut being generally parallel to the first, to form a lamina of hardmetal between the two lines of cut, said lamina comprising a single piece of hardmetal having a continuous non-interrupted surface, and then securing the single piece lamina to the surface of a mounting bolster shaped to receive the lamina, thereby to form the complete slipper surface.

2. A method as claimed in claim 1 wherein the second cut is of similar profile to the first but spaced therefrom by a predetermined distance in a particular direction perpendicular to the wire electrode so that the lamina has a thickness in the said direction equal to the predetermined distance.

3. A method as claimed in claim 1 wherein the lamina is secured to the bolster by adhesive.

4. A method as claimed in claim 1 in which the hardmetal lamina is undulant.

5. A method as claimed in claim 4 further comprising the step of embedding cooling pins in the bolster adjacent to the hardmetal lamina and projecting from the bolster for cooling the slipper in use.

6. A method as claimed in claim 5 wherein the projecting ends of the pins are finned.

7. A method as claimed in claim 4 further comprising securing a shear stop member to the bolster while abutting the lamina to prevent shear failure between the lamina and bolster.

8. A hardmetal surfaced slipper for a tile making machine made by a method as claimed in claim 4.

9. A tile making machine having a hardmetal surfaced tool as claimed in claim 8.

* * * * *